United States Patent [19]

Yoshihara et al.

[11] 4,230,829

[45] Oct. 28, 1980

[54] POWDERY COATING COMPOSITION

[75] Inventors: Ichiro Yoshihara; Tadashi Watanabe; Osamu Iwase, all of Hiratsuka, Japan

[73] Assignee: Kansai Paint Company, Limited, Amagasaki, Japan

[21] Appl. No.: 969,195

[22] Filed: Dec. 13, 1978

[30] Foreign Application Priority Data

Dec. 21, 1977 [JP] Japan ............................... 52-154916

[51] Int. Cl.³ ............................................. C08L 61/28
[52] U.S. Cl. ................................. 525/162; 525/163; 525/443; 525/934
[58] Field of Search ................. 260/850; 525/162, 163, 525/443

[56] References Cited

U.S. PATENT DOCUMENTS

| | | | |
|---|---|---|---|
| 3,624,232 | 11/1971 | Van Dorp | 260/850 |
| 3,759,854 | 9/1973 | Chang | 260/850 |
| 3,842,021 | 10/1974 | Grant | 260/850 |
| 3,887,642 | 6/1975 | Vandersmissen | 260/850 |
| 3,919,350 | 11/1975 | Iwasawa | 260/850 |
| 3,922,447 | 11/1975 | Isaksen | 260/850 |
| 3,953,403 | 4/1975 | Fujiyoshi | 260/850 |
| 3,980,732 | 9/1976 | Isaksen | 260/850 |
| 3,980,733 | 9/1976 | Isaksen | 260/850 |
| 4,075,261 | 2/1978 | Fujiyoshi | 260/850 |
| 4,102,943 | 7/1978 | Isaksen | 260/850 |
| 4,118,437 | 10/1978 | Parekh | 260/850 |
| 4,133,843 | 1/1979 | Isaksen | 260/850 |
| 4,151,220 | 4/1979 | Watanabe | 260/850 |

FOREIGN PATENT DOCUMENTS

| | | | |
|---|---|---|---|
| 750629 | 11/1970 | Belgium | 260/850 |
| 1954678 | 5/1971 | Fed. Rep. of Germany | 260/850 |
| 4663320 | 3/1973 | Japan | 260/850 |
| 49-92123 | 9/1974 | Japan | 260/850 |
| 50-48166 | 4/1975 | Japan . | |
| 51-48267 | 4/1976 | Japan . | |
| 53-36853 | 10/1978 | Japan | 260/850 |
| 1413681 | 11/1975 | United Kingdom | 260/850 |

*Primary Examiner*—Paul Lieberman
*Attorney, Agent, or Firm*—Larson, Taylor and Hinds

[57] ABSTRACT

The powdery coating composition of the present invention comprises:
  (i) 10 to 40% by weight of a solid cross-linking agent prepared by heating polyester and alkoxyaminotriazine, and
  (ii) 90 to 60% by weight of a base resin.

An object of the present invention is to provide a powdery coating composition which will not pose any environmental pollution and has an outstanding property against bubbling.

The above object can be fulfilled by using the solid cross-linking agent in combination with a base resin.

14 Claims, No Drawings

POWDERY COATING COMPOSITION

This invention relates to powdery coating compositions, and more particularly to powdery coating compositions containing an aminotriazine derivative as a cross-linking agent.

Many kinds of thermosetting powder coating compositions have been heretofore developed. The inventors have already developed a thermosetting powder coating composition comprising an alkyletherified methylolmelamine mixture as a cross-linking agent and a polyester base resin (Japanese Patent Application No. 54,550/72). This coating composition has an improved property against popping which has been a drawback of conventional thermosetting coating compositions.

With the severity of regulations to control environmental pollution in recent years, stringent conditions have been imposed on coating compositions of this type in respect of the quality, preparation and storage of the compositions as well as coating operations. Among other things, problems are encountered with such compositions in that when baked for the formation of coatings, the composition releases volatiles, emitting a mist and formalin odor.

Powdery coating compositions containing an aminotriazine as a cross-linking agent have already been developed. The known compositions give off a heavy mist and strong formalin odor during the preparation thereof, namely when a mixture of vehicle, pigment and additive are melted together to obtain a uniform dispersion, or when the composition applied to workpieces is baked in an oven to form coatings.

Japanese Patent No. 873110 (Published Examined Patent Application No. 48167/1976) discloses powdery coating compositions composed of an alkoxyaminotriazine and an acrylic resin. More specifically the disclosed coating compositions consist essentially of (1) 4 to 20% by weight of an etherified methylolmelamine mixture containing

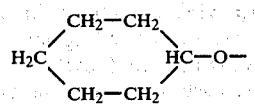

groups and methoxy groups in the combined number of 5.5 to 6.0 per triazine ring on the average, the number of the former groups being 0.5 to 3.0 per triazine ring on the average, and (2) 96 to 80% by weight of an acrylic resin having a softening point of 65° to 130° C. and an acid value of 5 to 20 and containing 0.4 to 2.0 moles of free hydroxyl groups per kilogram of the resin. Japanese Patent No. 873109 (Published examined patent application No. 48166/1975) also discloses powdery coating compositions composed of an alkoxyaminotriazine and an acrylic resin. More specifically stated, the disclosed coating compositions consist essentially of (1) 4 to 20% by weight of an etherified methylolmelamine mixture containing $ROCH_2CH_2O-$groups (R: alkyl group having 1 to 4 carbon atoms) and $CH_3O-$groups in the combined number of 5.5 to 6.0 per triazine ring on the average, the number of the former groups being 0.5 to 3.0 per triazine ring on the average, and (2) 96 to 80% by weight of an acrylic resin having a softening point of 65° to 130° C. and an acid value of 5 to 20 and containing 0.4 to 2.0 moles of free hydroxyl groups per kilogram of the resin. These two compositions have an improved property against bubbling (the phenomenon in which the gas produced during the baking of the composition vaporizes off through the coating of increased viscosity, leaving holes or small craters in the coating) and have been greatly improved over the above-mentioned aminotriazine-containing compositions in that they entail substantially reduced emission of mist and formalin odor, which however, may still pose problems in factories located for example in urban areas.

Powdery coating compositions are known which contain a vehicle component prepared by partially reacting with heating a mixture of a hydroxyl-containing resin and an alkoxyamino compound in the weight ratio ranging from 97:3 to 80:20 until a reaction efficiency reaches about 10%. However, due to the large proportion of the hydroxyl-containing resin, a partial cross linking is likely to occur between the resin and the alkoxyamino compound. Thus difficulty is encountered in forming a smooth coating layer by direct application of the powdery coating composition comprising such reaction product.

The main object of this invention is to provide powdery coating compositions which will not give off a mist or formalin odor detrimental to the environment.

Another object of this invention is to provide powdery coating compositions which will not pose any environmental pollution problem even in factories located in urban areas.

Still another object of this invention is to provide powdery coating compositions having an outstanding property against bubbling and therefore comparable to the known compositions composed of polyester and an alkoxyaminotriazine in this property.

These and other objects of this invention will become apparent from the following description.

The foregoing objects of this invention can be fulfilled by using a solid cross-linking agent having a softening point of 50° to 120° C. and prepared by heating 40 to 70% by weight of polyester having free hydroxyl groups and 60 to 30% by weight of the alkoxyaminotriazine specified below. Stated more specifically, this invention provides powdery coating compositions comprising: (1) 10 to 40% by weight of a solid cross-linking agent having a softening point of 50° to 120° C. and prepared by heating 40 to 70% by weight of polyester having free hydroxyl groups and 60 to 30% by weight of an alkoxyaminotriazine, and (2) 90 to 60% by weight of a base resin having softening point of 60° to 130° C. and an acid value of up to 30 and containing 0.4 to 2.0 moles of free hydroxyl groups per kilogram of the resin, the alkoxyaminotriazine having 0 to 1 non-methylolated NH bond per triazine ring, at least 80% of the methylol groups of the alkoxyaminotriazine having been alkoxylated with alcohol.

The use of the above-specified cross-linking agent in the compositions of this invention greatly inhibits or prevents the emission of mist and formalin odor during the preparation of the compositions as well as the baking of the compositions applied to workpieces, further producing outstanding effects in preventing bubbling and giving improved curability at low temperatures (up to 170° C.) and an improved anti-blocking property. These effects are achieved solely by the use of the cross-linking agent prepared from polyester having free hydroxyl groups and the specified alkoxyaminotriazine in the specified ratio of 40–70% by weight of the former to 60–30% by weight of the latter by heating the two ingredients. Even if the polyester and the above-specified alkoxyaminotriazine are heated, the resulting product would fail to give the foregoing effects when the two ingredients are used in ratios outside the above-mentioned range. With this invention, since the proportions of the polyester and alkoxyaminotriazine contained in the cross-linking agent are within the foregoing specific range, alkylalkoxy groups of the alkoxyaminotriazine partly participate in the reaction between the polyester and the alkoxyaminotriazine, and the reaction product has a structure in which to the polyester is added about 1 mole of alkoxyaminotriazine per mole of the hydroxyl group contained in the polyester. Therefore, it is presumed that no gelation reaction takes place during the progress of the reaction for production of the cross-linking agent.

Cross-linking agents useful in this invention are those prepared by heating polyester having free hydroxyl groups and the alkoxyaminotriazine specified above.

Polyesters useful in this invention for preparation of the cross-linking agent are any of those containing 0.5 to 2.3 moles more preferably 0.7 to 2.0 moles of free hydroxyl groups per kilogram of the polyester and having a softening point of 60° to 140° C. and an acid value of up to 20 (preferably up to 15) and are not particularly limited in the method of preparation thereof. The softening point is measured according to JIS-K-2531. Examples of carboxylic acids useful for the preparation of such polyester resins are 1,2,4-benzenetricarboxylic acid, phthalic acid, tetrahydrophthalic acid and hexahydrophthalic acid; anhydrides or mono- or tri-alkyl esters of such acids; isophthalic acids, terephthalic acid, azelaic acid, adipic acid and sebacic acid; mono- or di-alkyl esters of such acids; and benzoic acid, p-tert-butylbenzoic acid, etc. Among these examples, preferable are dimethyl ester of terephthalic acid, dimethyl ester of isophthalic acid, isophthalic acid, trimellitic acid anhydride, hexahydrophthalic anhydride, adipic acid, sebacic acid and p-tert-butylbenzoic acid. Examples of dihydric alcohols useful for the polyester resins are ethylene glycol, diethylene glycol, propylene glycol, trimethylene glycol, 1,3-, 1,2- and 1,4-butanediols, hexanediol, neopentyl glycol, 1,4-cyclohexanedimenthanol, etc., among which preferable are ethylene glycol, 1,3-butanediol and neopentyl glycol. Typical of useful trihydric or polyhydric alcohols are glycerine, trimethylolpropane, trimethylolethane, trishydroxyethyl isocyanurate, pentaerythritol, etc. Materials other than these examples are useful according to this invention insofar as they can be polyesterified in a suitable combination to resins having the specified softening point and acid value and containing the specified amount of hydroxyl groups as mentioned above.

Polyesters used for the preparation of the cross-linking agents are prepared by the known method. For example, when carboxylic acids and/or anhydrides thereof and polyhydric alcohols are used, they are condensed with each other by being heated at 180° to 300° C. in the presence or absence of a solvent capable of azeotropically distilling with water. When using dialkyl esters of dicarboxylic acids, the esters and polyhydric alchols undergo an ester-interchange reaction for estrification by being heated at 200° to 300° C. in the presence of a catalyst such as lead oxide, lead salts of aliphatic acids, lead naphthenate, lithium hydroxide, lithium salts of aliphatic acid, lithium naphthenate, zinc acetate, etc. Also, when dicarboxylic acids and/or anhydride thereof and dialkyl esters of dicarboxylic acids are conjointly used, they undergo the same esterinterchange reaction and then to the reaction product is added carboxylic acids and/or anhydride thereof. Subsequently the mixture is heated at 180° to 300° C. and condensed with one another.

Alkoxyaminotriazines useful in this invention for the preparation of the cross-linking agents, are those having 0 to 1 non-methylolated NH bond per triazine ring, with at least 80% of the methylol groups thereof etherified with an aliphatic alcohol having 1 to 4 carbon atoms. Representative examples of aminotriazines are melamine, benzoguanamine, acetoguanamine, formoguanamine, spiroguanamine, etc. Examples of useful aliphatic alcohols are those usually having 1 to 4 carbon atoms, such as methanol, ethanol, propanol, isopropanol, n-butanol, isobutanol, sec-butanol, etc.

In order to obtain improved surface smoothness of coating layer and to prevent occurrence of popping in a coating layer, it is more preferable with this invention to use alkoxyaminotriazines having mixed alkoxylated groups comprising (i) 50 to 95% (preferably 60 to 90%) of groups in which methylol groups are alkoxylated with lower aliphatic alcohol having 1 to 4 carbon atoms and (ii) 5 to 50% (preferably 10 to 40%) of groups in which methylol groups are alkoxylated with at least one of aliphatic having 5 or more carbon atoms, alicyclic alcohol and ethylene glycol monoalkyl ether. Examples of useful aliphatic alcohols having at least 5 carbon atoms include n-amyl alcohol, isoamyl alcohol, neopentanol, n-hexanol, cyclohexanol, n-heptanol, n-octyl alcohol, 2-ethylhexanol, etc., among which cyclohexanol is preferably used. Useful ethylene glycol monoalkyl ethers are those in which the alkyl has 1 to 4 carbon atoms, such as ethylene glycol monomethyl ether, ethylene glycol monoethyl ether, ethylene glycol monobutyl ether, etc.

With the present invention, it is necessary to alkoxylate more than 80% of all methylol groups. When less than 80% of all methylol groups is alkoxylated, popping will occur in a coating layer.

Alkoxyaminotriazines are prepared by alkoxylating methylolmelamines or methylolguanamines with aliphatic alcohol having 1 to 4 carbon atoms, aliphatic alcohol having at least 5 carbon atoms, alicyclic alcohol or ethylene glycol monoalkyl ether. When using aliphatic alcohol having 1 to 4 carbon atoms, known methods are applicable for the alkoxylation. The mixed alkoxylation is conducted by alkoxylating the methylol groups of the methylolmelamine or methylolguanamine with aliphatic alcohol having 1 to 4 cabon atoms; then heating the resulting product conjointly with at least one of aliphatic alcohol having at least 5 carbon atoms, alicyclic alcohol and ethylene glycol monoalkyl ether at a temperature of 30° to 120° C. and a reduced pressure of 40 to 100 mm Hg for 1 to 20 hours to effect etherification; and neutralizing the resulting mixture to a pH of 7 to 8 with a sodium hydroxide solution. The neutralized mixture is concentrated substantially to 100% by removing unreacted alcohol or glycol ether at a temperature of 130° to 160° C. and a reduced pressure of 10 mm Hg or lower. The concentrate is filtered to remove the salt formed on neutralization.

The cross-linking agents of this invention are prepared from the polyester and the alkoxyaminotriazine in the ratio of 40–70% by weight, preferably 50–70% by weight, of the former to 60–30% by weight, preferably 50–30% by weight, of the latter by heating the two components at 50° to 120° C., preferably at 60° to 110° C., for 1 to 6 hours. With less than 30% by weight of alkoxyaminotriazine present, the mixture of the two components tends to wholly or partially gel during heating, with the objectionable result that the gelation, even if occurring partially, gives a seeding (rough surface caused by containing coarse particles) or very poor smoothness to the coating formed. Conversely if more than 60% by weight of the alkoxyaminotriazine is used, the resulting cross-linking agent will not be in the form of a solid, presenting difficulties in the preparation of coating compositions and affording a reduced anti-blocking property to the powdery coating compositions obtained. For the reaction of the two components, a solution of the polyester, the alkoxyaminotriazine and solvent are mixed together in predetermined amounts and are reacted in the presence of a small amount, usually 0 to 1.0% by weight or preferably 0 to 0.1% by weight, of an acid at 50° to 120° C., preferably at 60° to 110° C., for 1 to 6 hours, preferably for 1.5 to 5 hours. Examples of useful solvents for this reaction are toluene, methyl acetate, ethyl acetate, n-butyl acetate, acetone, methyl ethyl ketone, methyl iso-butyl ketone, dioxane, tetrahydrofuran, etc., among which toluene, ethyl acetate, methyl ethyl ketone and methyl isobutyl ketone are preferable. Examples of useful acids are p-toluene sulfonic acid, monochloro acetic acid, dichloro acetic acid, trichloro acetic acid, citric acid, orthophosphoric acid, nitric acid, etc. Such an acid, when used, will promote the reaction. The solvent is distilled off from the reaction mixture at reduced pressure, and the residue is run off from the reactor at a temperature of not higher than 150° C. and then cooled, whereby a solid cross-linking agent can be obtained.

The cross-linking agents of this invention can be reacted further with an acid amide. Examples of useful acid amides are amides of toluenesulfonic acid, benzenesulfonic acid, xylenesulfonic acid, and like aromatic sulfonic acids; amides of toluenecarboxylic acid, benzoic acid, yxlenecarboxylic acid and like aromatic carboxylic acids; amides of cyclohexyl sulfonic acid, cyclohexyl-1-methyl-4-sulfonic acid and like alicyclic sulfonic acids; and amides of cyclohexyl carboxylic acid, cyclohexyl-1-methyl-4-carboxylic acid and like alicyclic carboxylic acids. Preferable among these examples are p-toluenesulfonic acid amide, p-toluenecarboxylic acid amide, benzenesulfonic acid amide and cyclohexyl sulfonic acid amide. Such an acid amide is used in an amount of up to 30% by weight, preferably 2 to 20% by weight, based on the weight of the polyester and the alkoxyaminotriazine. The use of the acid amide gives the cross-linking agent a higher softening point and consequently imparts an improved anti-blocking property to the powdery coating compositions prepared without producing any adverse effect on the properties of the coatings to be formed. The acid amide, if used in excess of 30% by weight, tends to produce a scorched color to the coatings on baking. The acid amide may be reacted with the cross-linking agent simultaneously with the reaction between the polyester and the alkoxyaminotriazine, but it is preferable to effect the reaction of the polyester and alkoxyaminotriazine first, add the acid amide to the reaction mixture and heating the resulting mixture at 50° to 120° C. for a further 1 to 5 hours together with a small amount, usually about 0 to about 1.0% by weight, of an amine. The amine acts to retard the reaction. Examples of useful amines are dimethyl amino ethanol, diethanolamine, triethanolamine and the like.

Base resins useful in this invention are acrylic resins and/or polyester resins.

Acrylic resins are those having a free hydroxyl group and prepared by polymerizing in the usual manner at least one of monomers having a hydroxyl group and monomers having no functional group (OH group or COOH group), along with at least one of monomers having a carboxyl group when so desired. Preferable examples are those prepared by solution polymerization in the presence of a solvent and a radical polymerization initiator. Examples of monomers having a hydroxyl group are hydroxyalkyl acrylates and hydroxyalkyl methacrylates, among which preferable are 2-hydroxyethyl acrylate, 2-hydroxypropyl acrylate, 2-hydroxyethyl methacrylate, 2-hydroxypropyl methacrylate, etc. Examples of monomers having no functional group are polymerizable vinyl monomers having no OH or COOH group. Preferable examples are styrene, vinyltoluene, α-methylstyrene, vinyl acetate and alkyl (having 1 to 12 carbon atoms) esters of acrylic acid or methacrylic acid. Examples of monomers having a carboxyl group are polymerizable monomers having at least one carboxyl group. Preferable examples are acrylic acid, methacrylic acid, crotonic acid, itaconic acid, maleic acid, etc. Radical polymerization initiators useful for the polymerization are those soluble in solvents or oils and generally used. Specific examples of such initiators are benzoyl peroxide, lauroyl peroxide, azobisisobutyronitrile, azobisisovaleronitrile, etc. When it is desired to adjust the softening point of the resin by varying the molecular weight thereof, lauroylmercaptan, t-dodecylmercaptan or like chain transfer agent can be used in an amount of up to 5% by weight based on the combined amount of the monomers used. Examples of useful solvents for the polymerization are toluene, xylene, ethyl acetate, n-butyl acetate, methyl ethyl ketone, methyl isobutyl ketone, n-butanol, isobutanol, propanol, isopropanol, etc. The polymerization is conducted effectively under the usual condition. For example, monomers and radical polymerization initiators are added dropwise into solvents at a temperature of 50° to 150° C. and at monomer concentration of 30 to 70% by weight over a period of 1 to 5 hours, and then to the resulting solution a catalyst is added. The resulting mixture is maintained at the same temperature for 1 to 5 hours to complete the polymerization and the solvent is removed from the polymerized mixture under a reduced pressure.

Polyesters useful as base resins are those which are prepared by the same method as in preparation of the cross-linking agent.

It is critical that the base resins useful in this invention have a softening point of 60° to 130° C. as determined according to JIS-K-2531 (ring-and-ball method). Base resins having a softening point of lower than 60° C. are not desirable since the resin particles tend to cohere to each other, whereas those having a softening point of over 130° C. involve the likelihood of giving coatings of reduced smoothness when made into thin coatings (about 60 to about 70μ in thickness). The base resins should further have an acid value of not higher than 30, preferably 0 to 20. If the acid value is higher than 30, the particles of the coating composition obtained will melt and start to undergo curing reaction before forming a coating, reducing the flowability of the composition applied to the workpiece and failing to give a glossy and smooth-surfaced coating. Moreover increased bubbling will result. Thus the composition will not be useful. According to this invention, it is also required that the base resins contain 0.4 to 2.0 moles (preferably 0.5 to 2.0 moles) of free hydroxyl groups per kilogram of the resin. When containing less than 0.4 mole of hydroxyl groups per kilogram of the resin, the resin will have an insufficient number of cross-linkable functional groups, giving reduced curability to the coating prepared therefrom, whereas with more than 2.0 moles of hydroxyl groups present per kilogram of the resin, too great a curing velocity will result, affording coatings of reduced gloss and reduced smoothness and greater susceptibility to bubbling.

The powdery coating compositions of this invention consist essentially of 10 to 40% by weight, preferably 20 to 40% by weight, of the cross-linking agent of the invention and 90 to 60% by weight, preferably 80 to 60% by weight, of the base resin. If the amount of the cross-linking agent is less than 10% by weight, the composition will have decreased curability at low temperatures (at about 170° C.), whereas if it is more than 40% by weight, reduced anti-blocking properties will result.

According to this invention, when the alkoxyaminotriazine having mixed alkoxylated groups (including part of methylol groups alkoxylated with lower aliphatic alcohol having 1 to 4 carbon atoms and the remaining part thereof alkoxylated with at least one of aliphatic alcohol having at least 5 carbon atoms, alicyclic alcohol and ethylene glycol monoalkyl ether) are reacted with the polyester for preparation of the cross-linking agent, a cross-linking reaction does not occur. The reaction fails to take place presumably on the following grounds:

(i) The groups alkoxylated with aliphatic alcohol having 1 to 4 carbon atoms are mostly reacted with the polyester and the groups alkoxylated with at least one of aliphatic alcohol having at least 5 carbon atoms, alicyclic alcohol and ethylene glycol monoalkyl ether are hardly reacted with the polyester.

(ii) The alkoxyaminotriazine appears to be reacted with the polyester in the ratio of 1 mole of the former per 1 mole of hydroxyl groups of the latter, since the alkoxyaminotriazine and polyester are used in the specified ratio as shown above.

In the present invention, when a powder coating composition comprising the above specified cross-linking agent and a base resin is hardened with heating, no popping will occur since the groups alkoxylated with aliphatic alcohol having 1 to 4 carbon atoms are present in a small amount in the cross-linking agent. Also the coating layer formed of the above powder coating composition has a smooth surface, because the groups alkoxylated with at least one of aliphatic alcohol having at least 5 carbon atoms, alicyclic alcohol and ethylene glycol monoalkyl ether are free from hardening reaction and dissolve the base resin to give improved fluidity of the coating composition.

The powdery coating compositions of this invention can be formulated by any of the known methods of preparing powdery coating compositions, for example, by mixing the cross-linking agent and basic resin, along with a pigment and other additives when so desired, usually at about 80° to about 120° C. with use of two or three rolls or an extruder of the heating type and comminuting the mixture. It is also possible to mix the base resin and a pigment with heating along with other additives desired, comminute the mixture and admixing the cross-linking agent with the mixture with heating. This method is advantageous in avoiding an excessive thermal effect, assuring the desirable features of the present composition with improved results. Pigments useful in this invention are various and include coloring pigments such as titanium dioxide, lithopone, zinc white, organic red lake pigment, red iron oxide, organic yellow pigment, pthalocyanine blue, carbon black, aluminum powder paste, etc., and extender pigments such as calcium carbonate, clay, talc, mica, etc. Examples of other additives are surface smoothening agents, cissing preventing agents, pigment dispersing agent and the like.

The powdery coating compositions of this invention are applicable by any coating method usable for known powdery coating compositions, for example, by an electrostatic powder spray method, a fluidized bed coating method, etc.

This invention will be described below in greater detail with reference to Reference Examples for the preparation of cross-linking agents and base resins and Examples for the preparation of compositions of the invention, in which the parts and percentages are all by weight.

REFERENCE EXAMPLE 1

Preparation of Cross-Linking Agent a (1) Preparation of alkoxyaminotriazine a

Into one-liter three-necked flask equipped with a thermometer, stirrer and means for removing methanol produced as a by-product from the system are placed 390 parts of hexakismethoxymethylmelamine, 170 parts of cyclohexanol and 1 parts of 60% nitric acid. The mixture is gradually heated with the system maintained at reduced pressure of 50 to 60 mm Hg while the methanol resulting from the reaction is being removed from the system. The reaction is conducted at 50° C. for 3 hours.

After the completion of the reaction, the mixture is neutralized to a pH of 7.0 to 8.0 with a 30% methanol solution of sodium hydroxide. The neutralized mixture is concentrated substantially to 100% at a temperature of 140° to 150° C. in a vacuum of 5 mm Hg by removing the unreacted cyclohexanol. The concentrate is filtered to remove the salt formed on neutralization.

The reaction product thus obtained is in the form of a transparent, consistent liquid having a viscosity of Z-2 as determined by the Gardner-Holdt bubble viscometer. An analysis on the reaction product reveals that the product is cyclohexanol-modified methoxymethylmelamine containing 1.1 cyclohexyl group per triazine ring and hardly any methylol group.

(2) Preparation of polyester (b)

Into a reactor equipped with a stirrer, thermometer and separator are placed 582.0 parts (3.0 moles) of dimethyl terephthalate, 156.0 parts (1.5 moles) of neopentyl glycol, 93.0 parts (1.5 moles) of ethylene glycol and 40.2 parts (0.3 mole) of trimethyl propane. The mixture is melted by heating, and the melt is further heated to a temperature of 160° C. with stirring, whereupon 1.0 part of lead oleate is added to the melt. The mixture is further heated to 240° C. and maintained at this temperature for one hour while the methanol resulting from the reaction is being removed through the separator. Subsequently while maintaining the mixture of 240° C., whereupon 30 parts of A-solvent (product of Nihon Seiyu) is slowly added to the mixture. The resulting mixture is maintained at the same temperature for 2 hours while the methanol produced is separated from the A-solvent by the separator and removed.

The mixture resulting from the reaction is subjected to a vacuum to remove the A-solvent and then cooled. To the resulting mixture is added methyl isobutyl ketone to produce a 50% solution of polyester.

The polyester thus prepared has an acid value of 0.1 and contains 1.28 moles of free hydroxyl groups per kilogram of the polyester.

(3) Preparation of cross-linking agent a

Into the same reactor as above are placed 740 parts of the 50% solution of polyester (b) and 260 parts of the above alkoxyaminotriazine a. The mixture is stirred for 30 minutes, whereupon 0.05 part of p-toluenesulfonic acid is added to the mixture. The mixture is maintained at 90° C. for 2 hours while the methanol by-produced is being removed from the system. One part of triethanolamine is thereafter added to the reaction mixture, and the mixture is concentrated at a temperature of 110°–130° C. in a vacuum of 5 to 30 mm Hg to remove the methyl isobutyl ketone.

The reaction product thus prepared is in the form of a pale yellow solid containing 99.0% of nonvolatile component and having a softening point of 78° C.

REFERENCE EXAMPLE 2

Alkoxyaminotriazine b is prepared in the same manner as in preparation of alkoxyaminotriazine a except that 170 parts of cyclohexanol is placed in 160 parts of ethylene glycol mono-butyl ether. The alkoxyaminotriazine b thus prepared is ethylene glycol mono-butyl ether-modified methoxymethylmelamine containing 1.2 ethylene glycol mono-butyl ether groups per one triazine ring and hardly any methylol group. Cross-linking agent b is prepared in the same manner as in cross-linking agent a except that alkoxyaminotriazine a is placed in alkoxyaminotriazine b.

The cross-linking agent b thus prepared is in the form of a pale yellow solid containing 99.0% of nonvolatile component and having a softening point of 80° C.

REFERENCE EXAMPLE 3

To 200 parts of 50% methyl isobutyl ketone solution of the cross-linking agent b is added 20 parts of p-toluenesulfonic acid amide and the mixture is heated at 100° C. for 2 hours, whereupon one part of dimethylamino ethanol is added to the mixture. Cross-linking agent c obtained by removing the solvent from the resulting mixture contained 98.5% of nonvolatile component and has a softening point of 87° C.

REFERENCE EXAMPLE 4

Preparation of Base Resin A

Into a 2-liter four-necked flask equipped with a reflux condenser, stirrer, dropping funnel and thermometer is placed 800 parts of toluene, which is heated to 110° C. while nitrogen gas is being introduced into the flask. A mixture of 160 parts of 2-hydroxyethyl methacrylate, 40 parts of butyl acrylate, 264 parts of methyl methacrylate, 320 parts of ethyl methacrylate, 16 parts of acrylic acid and 10 parts of benzoyl peroxide placed in the dropping funnel is added dropwise to the toluene maintained at the same temperature over a period of 2 hours. A mixture of one part of benzoyl peroxide and 10 parts of toluene, serving as an additional catalyst, is then added dropwise to the mixture at the same temperature three times at an interval of one hour. The resulting mixture is maintained at 110° C. for further three hours. With the condenser changed over to a concurrent condenser, the temperature of the contents is gradually elevated to 140° C. while the solvent and unreacted monomers are being withdrawn from the system. When about 60% of the charged solvent has been run off, the reaction mixture is further concentrated at 160° C. in a vacuum of about 5 to about 50 mm Hg. On completion of the removal of the solvent, the residue is placed into a stainless steel vat and cooled for solidification. The acrylic resin thus prepared contained 99.2% of nonvolatile component and 1.49 moles of free hydroxyl groups per kilogram of the resin and has a softening point of 93° C. and an acid value of 15.3.

REFERENCE EXAMPLE 5

Preparation of Base Resin B

Into a reactor equipped with a stirrer, thermometer and separator are placed 194.0 parts (1.0 mole) of dimethyl terephthalate, 174.6 parts (0.9 mole) of dimethyl isophthalate, 292.0 parts (2.8 moles) of neopentyl glycol, and 27.6 parts (0.3 mole) of glycerin. The mixture is melted by heating, and the melt is further heated to a temperature of 160° C. with stirring, whereupon 1.0 part of lead oleate is added to the melt. The mixture is further heated to 240° C. and maintained at this temperature for one hour while the methanol resulting from the reaction is being removed through the separator. Subsequently 43.8 parts (0.3 mole) of adipic acid and 116.2 parts (0.70 mole) of isophthalic acid are added to the reaction mixture. This lowers the temperature of the system to about 180° C. The mixture is continuously heated to 240° C. whereupon 30 parts of xylene is slowly added to the mixture. The resulting mixture is maintained at the same temperature for 2 hours while the water produced is separated from the xylene by the separator and removed.

The mixture resulting from the reaction is subjected to a vacuum to remove the xylene, then cooled and withdrawn from the reactor while the residue is still flowable.

The polyester resin prepared has a softening point of 88° C. and an acid value of 8.0 and contains 1.06 moles of freee hydroxyl groups per kilogram of the resin.

REFERENCE EXAMPLE 6

Cross-linking agent d is prepared in the same manner as in preparation of cross-linking agent a except that 1134 parts of a 50% solution of polyester b and 63 parts of alkoxyaminotriazine a. Partially gelled product is found in the resulting reaction products. The cross-linking agent thus obtained contained 98.0% of nonvolatile component and has softening point of 74° C.

EXAMPLES 1 TO 4 AND COMPARISON EXAMPLES 1 TO 5

The cross-linking agents and base resins prepared in Reference Examples are mixed together in the proportions listed in Table 1 below with addition of 15 parts of cyclohexanone-type ketone resin (trademark: "ARON KR", product of Mitsui-Toatsu Co., Ltd., Japan) serving as a surface smoothening agent and 50 parts of titanium dioxide as a pigment.

Each of the mixtures is treated in an experimental hot roll mill, 8.8 cm in roll diameter, at 100° C. for 20 minutes to prepare a uniform melt, which is then comminuted in a hammer mill to a powder. The powder is screened by a 100-mesh sieve to obtain a white powdery coating composition.

In Table 1 the specimens of Examples 1 to 4 are examples of powder coating compositions prepared according to this invention, and the specimens of Comparison Examples 1 to 5 are those prepared to clarify the features of the invention.

TABLE 1

| Specimen | Base Resin | | Cross-Linking Agent | |
|---|---|---|---|---|
| | Kind | Amount (wt. pt.) | Kind | Amount (wt. pt.) |
| Example 1 | B | 65 | a | 35 |
| 2 | A | 70 | b | 30 |
| 3 | B | 75 | c | 25 |
| 4 | A | 80 | b | 20 |
| Comp. Ex. 1 | B | 95 | a | 5 |
| 2 | B | 55 | a | 45 |
| 3 | A | 80 | Cymel #300* | 20 |
| 4 | B | 80 | alkoxyaminotriazine (a) | 20 |
| 5 | Cross-Linking Agent D | | | 100 |

*Cymel #300 is a trademark of American Cyanamid Co., Ltd. for hexakismethoxymethylmelamine.

Each of the specimens is applied to 0.8-mm-thick polished mild steel panels by the electrostatic spray method to stepwise varying thicknesses and also to such a thickness that the coating will be about 80μ thick when cured, and the coated panels are baked at 170° C. for 30 minutes for curing. The panels with coatings of varying thicknesses are tested for the maximum thickness of the coating which permits the coating to remain free of bubbling (referred to as "bubbling-free thickness" in the following table). The panels with about 80-μ-thick coatings are tested for various properties of the coating. Table 2 shows the results.

JIS-K-5400, 6.14. The higher the hardness, the higher is the resistance to gasoline.

Anti-blocking property of the composition:

A 15.0 g portion of the powdery composition is placed in a test tube, 40 mm in diameter, then subjected to a load of 20 g/cm$^2$ at 35° C. for 240 hours and thereafter withdrawn from the test tube to observe whether the specimen restores its original form of finely divided particles. The degrees of the restoration are expressed by I, II, III, IV and V. The smaller the number, the better; "V" indicates that the specimen completely fails to restore itself. Thus the degrees of the restoration show the following ratings: I, excellent > II, good > III, fair > IV, poor > V, bad.

We claim:

1. A powdery coating composition comprising (1) 10 to 40% by weight of a solid cross-linking agent having softening point of 50° to 120° C. and prepared by heating 40 to 70% by weight of polyester having free hydroxyl groups with 60 to 30% by weight of an alkoxyaminotriazone at a temperature of 50° to 120° C. in the presence of a solvent for 1 to 6 hours, and (2) 90 to 60% by weight of a polyester, acrylic resin or mixtures thereof having a softening point of 60° to 130° C. and an acid value of up to 30 and containing 0.4 to 2.0 moles of free hydroxyl groups per kilogram of the resin, the alkoxyaminotriazine having 0 to 1 non-methylolated NH bond per triazine ring, at least 80% of the methylol groups of the alkoxyaminotriazine having been alkoxylated with alcohol.

2. The powdery coating composition according to claim 1 in which said solid cross-linking agent is prepared by heating 50 to 70% by weight of polyester having free hydroxyl groups and 50 to 30% by weight of an alkoxyaminotriazine.

3. The powdery coating composition according to claim 1 in which said heating is conducted in the pres-

TABLE 2

| | Example | | | | Comp. Example | | | | |
|---|---|---|---|---|---|---|---|---|---|
| | 1 | 2 | 3 | 4 | 1 | 2 | 3 | 4 | 5 |
| Reduced amount on heating (%) | 1.2 | 1.1 | 1.0 | 0.9 | 0.9 | 1.5 | 9.7 | 5.1 | 2.2 |
| Formalin odor when a composition is prepared | A | A | A | A | A | A | C | B | B |
| Formalin odor when a composition is baked | A | A | A | A | A | A | C | B | B |
| Mist when a composition is baked | A | A | A | A | A | A | C | B | B |
| Bubbling-free thiskness (μ) | 190 | 190 | 200 | 200 | 180 | 140 | 60 | 140 | 100 |
| Erichsen test (mm) | 7< | 7< | 7< | 7< | 3 | 1 | 0.5 | 5 | 7< |
| Gloss value (60° gloss) | 93 | 94 | 93 | 95 | 80 | 65 | 50 | 90 | 75 |
| Resistance to gasoline | H | 2H | H | 2H | 4B | 4B | 6B | 3B | 3B |
| Anti-blocking property | ◎ | ◎ | ◎ | ◎ | ○ | x | x | Δ | ○ |
| Smoothness | Good | Good | Good | Good | Rough | Rough | Rough | Rough | Greatly rough |

Note:
A: Nothing
B: Weak
C: Strong

Erichsen test:

According to JIS-Z-2247. The greater the numerical value, the higher is the flexibility.

Gloss value:

According to JIS-K-5400, 6.7.

Resistance to gasoline:

The test panel is immersed in gasoline ("Nisseki Silver Gasoline", trademark of Nippon Oil Co., Ltd., Japan) at 20° C. for 24 hours, then withdrawn and immediately tested for pencil hardness at 20° C. according to ence of a solvent.

4. The powdery coating composition according to claim 1 in which the methylol groups of alkoxyaminotriazine are alkoxylated with aliphatic alcohol having 1 to 4 carbon atoms.

5. The powdery coating composition according to claim 1 in which the alkoxyaminotriazine has mixed alkoxylated groups comprising (i) 50 to 95% of groups in which methylol groups are alkoxylated with lower aliphatic alcohol having 1 to 4 carbon atoms and (ii) 5 to 50% of groups in which methylol groups are alkoxylated with at least one of aliphatic alcohol having at least 5 carbon atoms, alicyclic alcohol and ethylene glycol monoalkyl ether.

6. The powdery coating composition according to claim 1 in which the alkoxyaminotriazine has mixed alkoxylated groups comprising (i) 50 to 95% of groups in which methylol groups are alkoxylated with lower aliphatic alcohol having 1 to 4 carbon atoms and (ii) 5 to 50% of groups in which methylol groups are alkoxylated with cyclohexanol and or ethylene glycol monoalkyl (C 1 to 4) ether.

7. The powdery coating composition according to claim 1 in which the polyester is that prepared by condensing carboxylic acid, anhydride thereof and mixtures thereof with polyhydric alcohol.

8. The powdery coating composition according to claim 1 in which the polyester is that prepared by condensing dialkyl ester of dicarboxylic acid with polyhydric alcohol.

9. The powdery coating composition according to claim 1 in which the polyester is that prepared by esterifying carboxylic acid, anhydride thereof and mixtures thereof with dialkyl ester of dicarboxylic acid and condensing the resulting ester with polyhydric alcohol.

10. The powdery coating composition according to claim 1 in which the alkoxyaminotriazine is alkoxymelamine, alkoxybenzoguanamine, alkoxyacetoguanamine, alkoxyformoguanamine or alkoxyspiroguanamine.

11. The powdery coating composition according to claim 1 in which said solid cross-linking agent is prepared by 40 to 70% by weight of polyester having free hydroxyl groups, 60 to 30% by weight of an alkoxyaminotriazine and up to 30% by weight of an acid amide based on the weight of the polyester and the alkoxyaminotriazine.

12. The powdery coating composition according to claim 11 in which said acid amide is at least one of amides of aromatic carboxylic acid, aromatic sulfonic acid, alicyclic sulfonic acid and alicyclic carboxylic acid.

13. The powdery coating composition according to claim 1 in which said base resin is polyester, acrylic resin or mixtures thereof.

14. The powdery coating composition according to claim 1 in which the proportions of a solid cross-linking agent and a base resin are 20 to 40% by weight of the former and 80 to 60% by weight of the latter.

* * * * *